No. 719,841. PATENTED FEB. 3, 1903.
W. J. McCARTHY.
TELEGRAPH POLE.
APPLICATION FILED AUG. 21, 1902.

NO MODEL.

WITNESSES:
W. H. Cotton
Arthur D. Seibold

INVENTOR.
William J. McCarthy
BY
Louis K. Gillson
ATTORNEY

THE NORRIS PETERS CO., PHOTO-LITHO., WASHINGTON, D. C.

UNITED STATES PATENT OFFICE.

WILLIAM J. McCARTHY, OF PESHTIGO, WISCONSIN, ASSIGNOR OF ONE-HALF TO WILLIAM D. MELLEN, OF PESHTIGO, WISCONSIN, AND HENRY J. CALLAGHAN, OF GREENBAY, WISCONSIN.

TELEGRAPH-POLE.

SPECIFICATION forming part of Letters Patent No. 719,841, dated February 3, 1903.

Application filed August 21, 1902. Serial No. 120,504. (No model.)

*To all whom it may concern:*

Be it known that I, WILLIAM J. MCCARTHY, a citizen of the United States, and a resident of Peshtigo, county of Marinette, and State of Wisconsin, have invented certain new and useful Improvements in Telegraph-Poles, of which the following is a specification, and which are illustrated in the accompanying drawings, forming a part thereof.

This invention relates to improvements in telegraph and the like poles or posts.

It has generally been the practice to employ wooden poles for supporting the line-wires of telegraph and telephone systems; but owing to the increasing scarcity of suitable timber poles of the requisite length and straightness are becoming more and more difficult to obtain and are consequently quite expensive.

The object of this invention is to provide a metallic pole as a substitute for the ordinary wooden pole and one which shall be comparatively light and yet sufficiently strong and rigid to answer the purposes for which it is intended.

The invention consists of the combination and arrangement of parts hereinafter particularly described, specifically designated in the claims, and illustrated in the accompanying drawings, in which—

Figure 1:
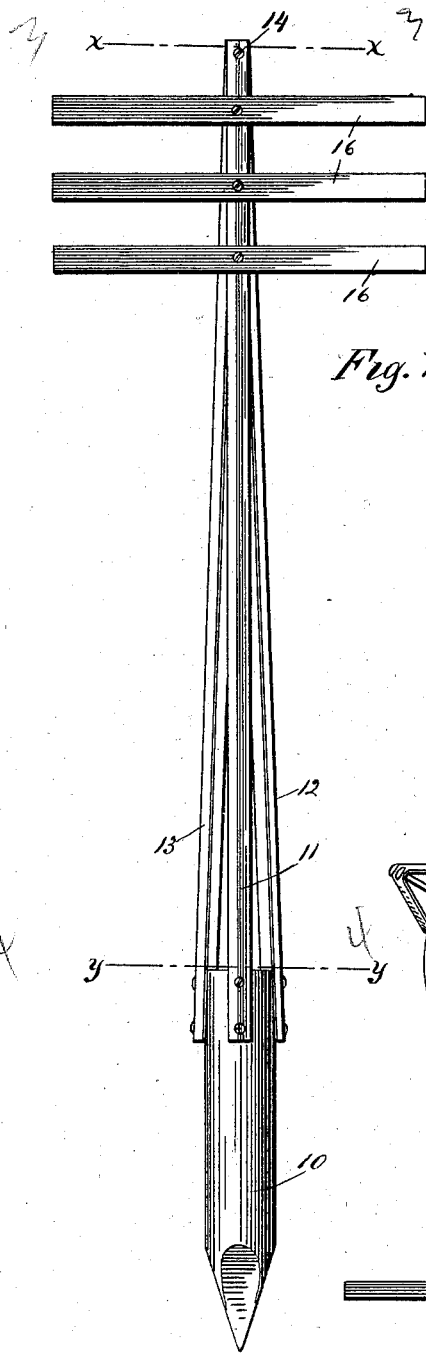
Figure 2:
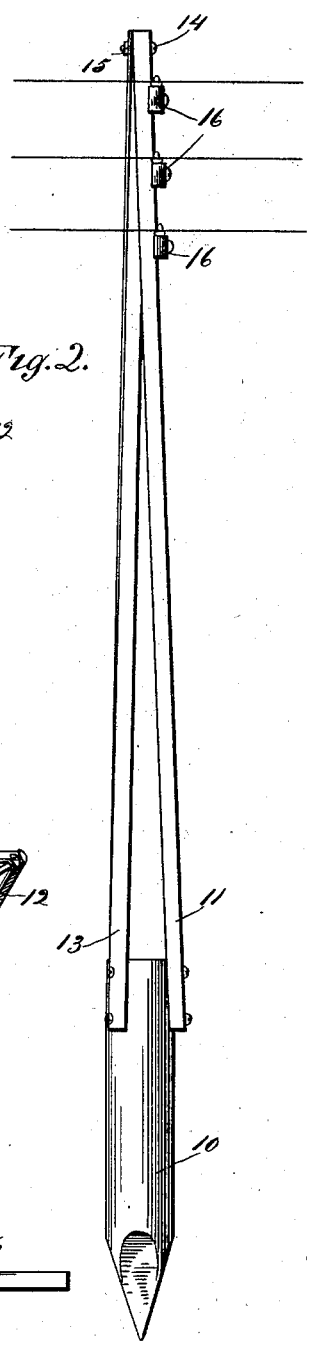
Figure 3:
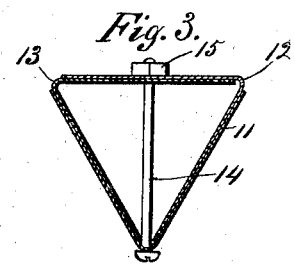
Figure 4:
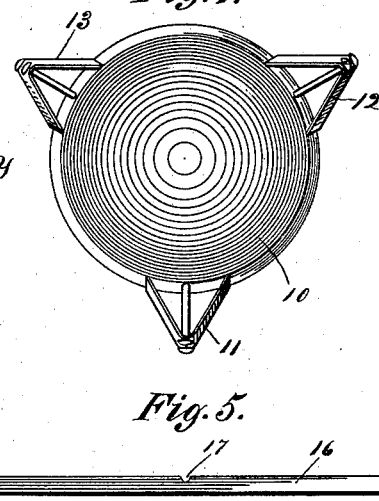
Figure 5:
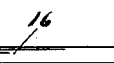

Figure 1 is a front elevation of the pole or post. Fig. 2 is a side elevation of the same. Fig. 3 is a section on the line $x\ x$ of Fig. 1. Fig. 4 is a section on the line $y\ y$ of Fig. 1, and Fig. 5 relates to a detail.

The pole constructed in accordance with my invention comprises generally a base designed to be planted or driven in the ground and to which are secured a plurality of angle-bars having their edges disposed toward the base and their upper ends inclined inwardly, the leaves at the top of the bars overlapping or interfolding and being secured as so arranged, preferably by a single bolt passing through the several bars.

The base 10 may be and preferably is made of wood and is designed to be buried or driven in the ground and have its upper end project slightly above the surface of the same to permit of the lower ends of the angle-bars being secured thereto. The base 10 should, of course, be of sufficient length to properly support the pole structure and may be placed in the ground before the angle-bars are secured thereto. These angle-bars, of which there are preferably three, as 11, 12, and 13, may be made of thin rolled steel or a suitable iron bent or cast in the desired shape, as the V shape shown in Figs. 3 and 4. They are arranged equidistant around the projecting upper end of the base 10, having their edges pointing inwardly and bearing against the base, and are secured thereto by bolts or spikes which pass through the angles of the bars, as shown in Fig. 4. The angle-bars are inclined inwardly at the upper ends thereof, the structure being slightly pyramidal in shape, and the leaves of the same are interfolded or overlapped at the top. In the construction illustrated, Fig. 4, the leaves of the bar 11 embrace the forwardly-projecting leaves of the bars 12 and 13 and the rear leaves of the latter bars overlap. A bolt 14, passing through the angle of the bar 11 and registering apertures in the back leaves of the bars 12 and 13 and provided with a retaining device, as the nut 15, serves to secure the bars together at the top. By this arrangement of interfolding the angle-bars are securely clamped or locked together and by a single bolt, and any tendency thereof to twist or turn is overcome, the result being a rigid strong though light structure and one that may be made at comparatively small cost.

The cross-arms 16, designed to support the line-wires, may be secured in any suitable manner. As shown, they are bolted to the bar 11, each being provided with a transverse groove 17, Fig. 5, adapted to engage the angle of the bar to which it is fastened. By this means the cross-arms are held securely in place and held from turning.

The angle-bars may be put together and then erected upon the base 10 after the latter has been inserted in the ground, or, if desired, the base and the metallic structure may be secured together and the whole erected in the manner of the ordinary wooden pole.

I claim as my invention—

1. In a telegraph and like pole, in combination, a base, angle-bars secured to the base and having their leaves disposed inwardly, each leaf of each bar at the upper end thereof overlapping the adjacent leaf of the other bars, and means for securing the overlapping leaves together.

2. In a telegraph and the like pole, in combination, a wooden base adapted to be placed in the ground, a plurality of angle-bars secured to the base and having their edges disposed toward and bearing against the base, the leaves of the bars at the upper ends being interfolded, and a bolt for securing the interfolded ends together.

3. In a telegraph and the like pole, in combination, a wooden base adapted to be placed in the ground, the V-shaped angle-bars 11, 12 and 13 having their edges disposed toward and bearing against the base and being inclined inwardly at the upper ends, the leaves of the bar 11 at the top thereof embracing one leaf each of the bars 12 and 13 and the other leaves of the latter bars overlapping, and a securing-bolt passing through the angle of the bar 11 and through the overlapping leaves of the bars 12 and 13.

WILLIAM J. McCARTHY.

Witnesses:
J. F. SLIGHT,
A. B. FRENCH.